United States Patent
Amato et al.

(10) Patent No.: US 9,764,718 B2
(45) Date of Patent: Sep. 19, 2017

(54) MANAGEMENT OF VEHICLE BRAKING

(71) Applicant: International Business Machines Corporation, Armonk, NY (US)

(72) Inventors: Christel Amato, Bazainville (FR); Aaron K. Baughman, Silver Spring, MD (US); Wilfredo Ferre, Le Mesnil le Roi (FR); Peter K. Malkin, Ardsley, NY (US); Marc P. Yvon, Antony (FR)

(73) Assignee: International Business Machines Corporation, Armonk, NY (US)

( * ) Notice: Subject to any disclaimer, the term of this patent is extended or adjusted under 35 U.S.C. 154(b) by 70 days.

(21) Appl. No.: 14/854,466

(22) Filed: Sep. 15, 2015

(65) Prior Publication Data

US 2017/0072921 A1    Mar. 16, 2017

(51) Int. Cl.
*B60T 8/172*    (2006.01)
*B60T 8/58*    (2006.01)
*B60T 7/22*    (2006.01)

(52) U.S. Cl.
CPC ........... *B60T 8/172* (2013.01); *B60T 7/22* (2013.01); *B60T 8/58* (2013.01); *B60T 2201/022* (2013.01); *B60T 2210/10* (2013.01); *B60T 2210/32* (2013.01); *B60T 2210/36* (2013.01); *B60T 2220/00* (2013.01)

(58) Field of Classification Search
CPC ........ B60T 8/172; B60T 8/58; B60T 2210/10; B60T 2210/32; B60T 2210/36; B60T 2220/00
See application file for complete search history.

(56) References Cited

U.S. PATENT DOCUMENTS 5,594,414 A * 1/1997 Namngani ............. B60Q 9/008
                                                    180/168
5,805,103 A * 9/1998 Doi .................... B60K 31/0008
                                                    340/435

(Continued)

OTHER PUBLICATIONS

William Strunk Jr. and E.B. White, The Elements of Style, 3rd Edition, 1979, all pages.*

(Continued)

*Primary Examiner* — Calvin Cheung
(74) *Attorney, Agent, or Firm* — Schmeiser, Olsen & Watts, LLP; Isaac J. Gooshaw (57) ABSTRACT

A method, and associated system and computer program product, for managing braking of a moving vehicle. A speed and deceleration of the moving vehicle are monitored. External and/or internal conditions relating to the moving vehicle and/or the vehicle's driver are detected. A hardware processor: calculates a braking distance for the moving vehicle for the detected external and/or internal conditions from the monitored speed and deceleration of the moving vehicle; determines a spacing distance between the moving vehicle and a second vehicle ahead of the moving vehicle; adds a cascading response distance to the calculated braking distance for a third vehicle ahead of the second vehicle; and determines that the calculated braking distance is greater than the determined spacing distance. An output is generated in response to the determination that the calculated braking distance is greater than the obtained spacing distance.

12 Claims, 8 Drawing Sheets

(56) References Cited

U.S. PATENT DOCUMENTS

| | | | |
|---|---|---|---|
| 6,050,655 A * | 4/2000 | Naito | B60T 8/17616 303/167 |
| 6,580,976 B1 * | 6/2003 | Belcea | B60T 7/128 340/988 |
| 6,737,963 B2 * | 5/2004 | Gutta | B60Q 9/008 180/271 |
| 6,819,234 B1 * | 11/2004 | Bunker | B60Q 1/444 340/384.3 |
| 7,602,311 B2 | 10/2009 | Price | |
| 8,172,674 B2 * | 5/2012 | Koyama | A63F 11/00 463/25 |
| 8,400,287 B2 | 3/2013 | Visconti et al. | |
| 8,489,318 B2 | 7/2013 | Reinisch et al. | |
| 8,510,012 B2 * | 8/2013 | Amato | B60K 31/0058 340/435 |
| 9,127,941 B2 * | 9/2015 | Suh | G01C 3/02 |
| 9,446,773 B2 * | 9/2016 | Kim | B60W 30/18072 |
| 2007/0040664 A1 * | 2/2007 | Johnson | B60Q 1/444 340/467 |
| 2007/0040666 A1 * | 2/2007 | Lenehan | B60Q 1/44 340/479 |
| 2008/0021627 A1 * | 1/2008 | Johnsson | B60W 10/06 701/96 |
| 2008/0082261 A1 * | 4/2008 | Tengler | B60R 16/00 701/414 |
| 2008/0100428 A1 * | 5/2008 | Price | B60K 31/0008 340/435 |
| 2008/0165029 A1 * | 7/2008 | Fu | B60Q 9/008 340/903 |
| 2008/0180528 A1 * | 7/2008 | Saito | G06K 9/00825 348/148 |
| 2009/0147996 A1 | 6/2009 | Peng | |
| 2009/0192666 A1 * | 7/2009 | Trippler | G08G 1/163 701/31.4 |
| 2011/0175753 A1 * | 7/2011 | Free | G08G 1/08 340/917 |
| 2011/0313665 A1 * | 12/2011 | Lueke | G01S 13/931 701/301 |
| 2012/0130629 A1 * | 5/2012 | Kim | B60W 30/085 701/301 |
| 2012/0179350 A1 * | 7/2012 | Taneyhill | B60W 10/06 701/96 |
| 2013/0135092 A1 | 5/2013 | Wu et al. | |
| 2013/0187771 A1 * | 7/2013 | Rothschild | G08G 1/096716 340/435 |
| 2013/0261916 A1 * | 10/2013 | Sekiguchi | B60T 7/22 701/70 |
| 2013/0345944 A1 * | 12/2013 | Kasiraj | B60W 30/16 701/96 |
| 2014/0015666 A1 * | 1/2014 | Rohr | B60Q 1/44 340/479 |
| 2014/0067220 A1 * | 3/2014 | Seiler | B60T 7/12 701/70 |
| 2014/0142798 A1 * | 5/2014 | Guarnizo Martinez | B60W 30/09 701/23 |
| 2015/0012204 A1 * | 1/2015 | Breuer | B60T 7/22 701/96 |
| 2015/0149059 A1 * | 5/2015 | Choi | B60W 30/146 701/96 |
| 2015/0232099 A1 * | 8/2015 | Miller | B60T 7/18 701/70 |
| 2015/0307025 A1 * | 10/2015 | Hedley | B60Q 1/30 701/36 |
| 2015/0307091 A1 * | 10/2015 | Gokan | B60W 30/09 701/70 |
| 2015/0314783 A1 * | 11/2015 | Nespolo | B60W 30/0953 701/301 |
| 2015/0344033 A1 * | 12/2015 | Fukuda | B60W 30/16 701/117 |

OTHER PUBLICATIONS

Craig Wright, lead author, The IT Regulatory and Standards Compliance Handbook: How to Survive an Information Systems Audit and Assessments, Syngress, copyright 2008, by Elsevier, Inc., ISBN 13: 978-1-59749-266-9, 366 pages.

Reyes et al., Best Damn Cybercrime and Digital Forensics Book Period, Your Guide to Digital Information Seizure, Incident Response, and Computer Forensics, copyright 2007, ISBN 13: 978-1-59749-228-7, 734 pages (4 attachments).

System and Method for Cooperative Bbraking and Communication of Safe Braking Distances, ip.com, IP.com No. 000210323, IP.com Electronic Publication: Aug. 30, 2011, 4 pages.

Chen et al., Forward Collision Warning System Considering Both Time-to-Collision and Safety Braking Distance, 978-1-4673-6322-8/13 copyright 2013 IEEE 8th Conference on Industrial Electronics and Applications (ICIEA), pp. 972-977.

Beverly Park Woolf, Building Intelligent Interactive Tutors, Student-centered strategies for revolutionizing e-learning, copyright 2009, ISBN: 978-0-12-373594-2, 480 pages.

John Ladley, Making EIM Enterprise Information Management Work for Business, Morgan Kaufmann is an imprint of Elsevier, copyright 2010, ISBN: 978-0-12-375695-4, 547 pages.

William Jones, Keeping Found Things Found, The Study and Practice of Personal Information Management, Morgan Kaufmann is an imprint of Elsevier, copyright 2008, ISBN: 978-0-12-370866-3, 447 pages.

* cited by examiner

FIG. 1

| Initial Speed (S_i) | Final Speed (S_f) | Trained Braking Distance | Car Context | Driver context | Environmental context |
|---|---|---|---|---|---|
| 50 | 20 | 23 | { } | { } | { road inclination } |
| 50 | 20 | 40 | { } | { } | { rain, wind} |
| 50 | 20 | 60 | { } | { } | { rain, wind, nightlight} |

MANAGEMENT OF VEHICLE BRAKING

TECHNICAL FIELD

The present invention relates to a method and a system for use with a moving vehicle.

BACKGROUND

Vehicle safety requires maintaining a moving vehicle a safe following distance behind another vehicle.

SUMMARY

A method, and associated system and computer program product, for managing braking of a moving vehicle. The method includes monitoring a speed and deceleration of the moving vehicle. The method further includes detecting one or more external and/or internal conditions relating to the moving vehicle and/or a driver of the moving vehicle. The method further includes calculating, by a hardware processor, a braking distance for the moving vehicle for the detected one or more external and/or internal conditions from the monitored speed and deceleration of the moving vehicle. The method further includes determining, by the processor, a spacing distance between the moving vehicle and a second vehicle ahead of the moving vehicle. The method further includes adding, by the processor, a cascading response distance to the calculated braking distance for a third vehicle ahead of the second vehicle, the cascading response distance calculated from a response distance for the second vehicle relative to the third vehicle. The method further includes determining, by the processor, that the calculated braking distance is greater than the obtained determined spacing distance. The method further includes generating an output in response to the determination that the calculated braking distance is greater than the obtained spacing distance.

BRIEF DESCRIPTION OF THE DRAWINGS

Embodiments of the present invention will now be described, by way of example only, with reference to the following drawings.

DETAILED DESCRIPTION

Figure 1:
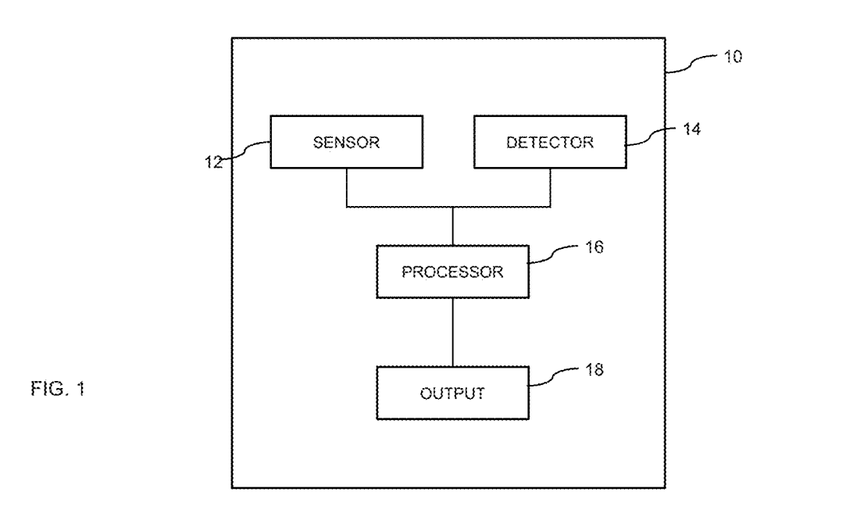
FIG. 1 is a schematic diagram of a system, in accordance with embodiments of the present invention.

FIG. 1 shows a system 10 that can be used on a vehicle (e.g., a car) to maintain the vehicle a safe following distance behind another vehicle. The system 10 alerts the current driver of the vehicle when the vehicle needs to slow down by braking in order to keep a safe distance behind the vehicle ahead on the road, or to brake in order to stop the vehicle, and use a probability sequence to the reaction times of drivers in front of the vehicle to slow down the vehicle. The system 10 takes into account the current driver's braking characteristic over time that includes the current driver's reaction time and also provides a look ahead to one or more drivers in front of the current driver. The response time is the time required to react from an alert signal to the starting action of braking.

The system 10 has four main components: a sensor 12 that monitors the speed and deceleration of the vehicle, a detection system 14 that detects external and/or internal conditions relating to the vehicle and/or the current driver of the vehicle, a processor 16 and an output device 18 that can provide an audio and/or visual output to the current driver of the vehicle. The system 10 records how much distance is required to slow down for a given speed to a lower speed. More precisely, each time there is a braking action, a triplet {Initial Speed, Final Speed, Braking Distance} is stored. So when the brake pedal is pressed, the system 10 records the triplet as input.

Furthermore, one dimension of the system is to complement this input with contextual information regarding, for example, a driver context (if provided, such as tiredness) and/or an environment context (such as rain, wind, etc.). The system has an enriched input represented by {Initial Speed, Final Speed, Braking Distance, Context {Driver, Environmental}}. The contextual information could also include a vehicle context relative to a status of the vehicle tire, the brakes, etc. The system 10 records this input in response to a braking action.

Figure 2:
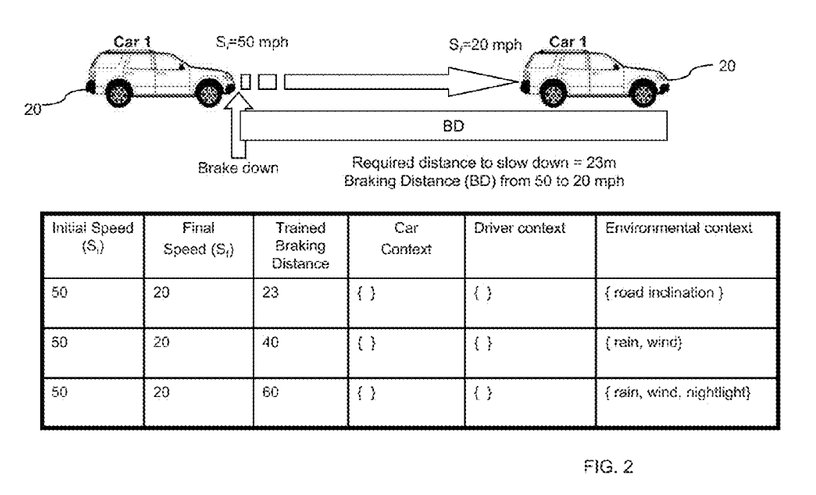
FIGS. 2 to 6 are schematic diagrams of a vehicle braking, in accordance with embodiments of the present invention.
Figure 3:
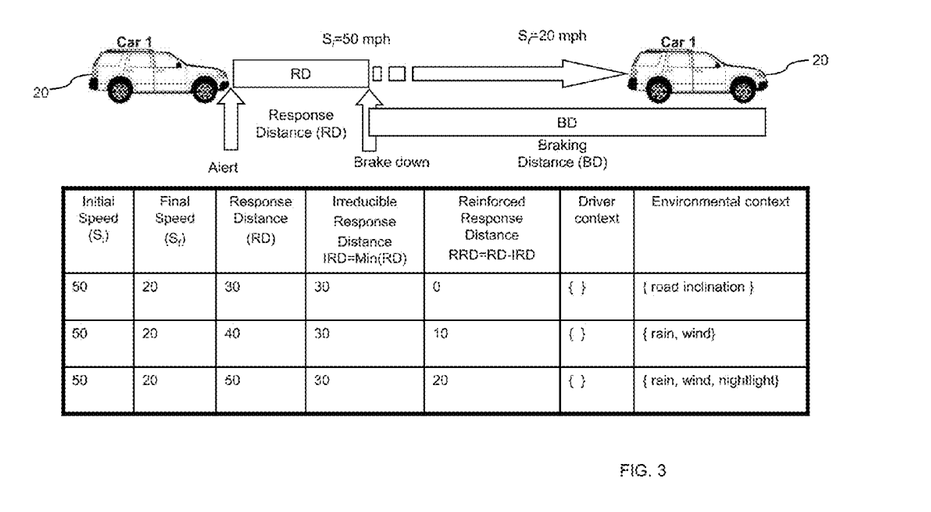

The system 10 has two training phases: a training phase 1 for braking distance (illustrated in FIG. 2) and a training phase 2 for response distance (illustrated in FIG. 3).

In FIG. 2, the vehicle 20 is slowing down from 50 mph to 20 mph and this braking action has been measured in different environmental contexts. The system 10 measures the trained braking distance, which is a distance required to slow down from 50 mph to 20 mph using the vehicle brake pedal. The driver performance is observed constantly and it can be seen that the measured trained braking distance is different in different environmental conditions. In the FIG. 2, "BD" stands for "braking distance".

FIG. 3 differs from FIG. 2 in that in this phase an alarm is introduced to alert the vehicle driver to slow down. When notified, the response time between the alert time and the start of braking is recorded. The response time is translated into a response distance using the vehicle speed. The response distance "RD", which is the total stopping distance, is broken into two components, an irreducible response distance "IRD" and a reinforced response distance "RRD", to obtain a measure as to the shortest possible response time in any condition (the IRD) and also how the specific measured conditions add to the response time (the RRD). The environmental contexts will change the response time as well as the actual braking function. As can be seen in FIG. 3, the total stopping distance is the sum of the IRD and the RRD.

One problem addressed by the system 10 is that the braking distance depends not only on many parameters such as the road, weather condition (dry or wet), brake and tire wear, daylight or night-light, the speed of both vehicles (the vehicle and the vehicle ahead), but also of the driver response time. The system 10 reinforces the driver response time by a knowledge system that is able to take into account a set of parameters. Alerts occur real-time and are not triggered on prefixed values but are triggered in the context of the specific driver, the environment, and the vehicle. The system 10 is designed to avoid collisions and any slamming of the brakes while staying in a safe distance zone.

Figure 4:
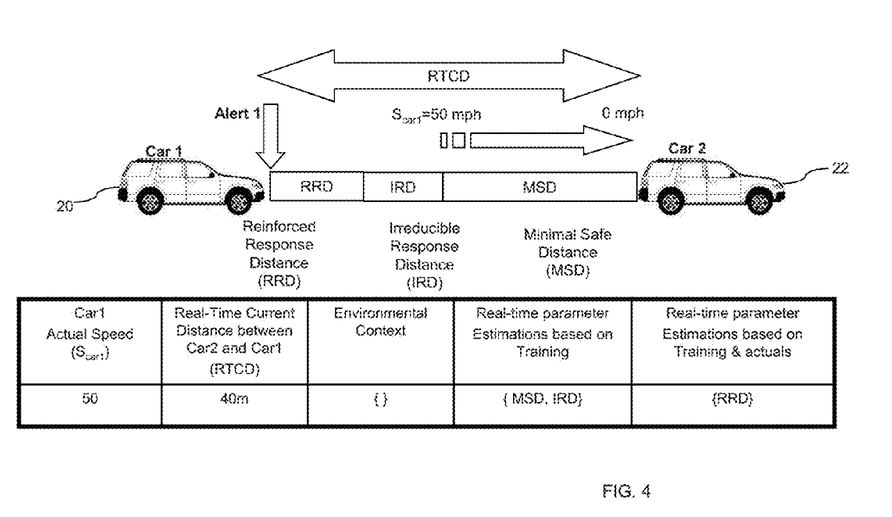
Figure 5:
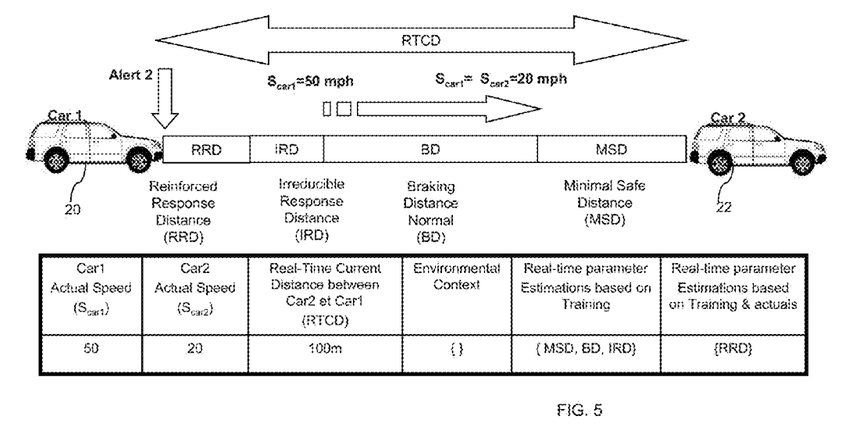

The system 10 implements two main alerts, an alert 1 notification (shown in FIG. 4) and an alert 2 notification (shown in FIG. 5).

The alert 1 notification shown in FIG. 4 is related to the distance required for the vehicle 20 to stop from the actual current speed in respect of a minimal safe distance (MSD). In FIG. 4, the vehicle 20 is assumed to be behind a second vehicle 22 that is ahead of the moving vehicle 20. The real-time current distance (RTCD) is the total actual distance between the two vehicles 20 and 22. The RTCD can be calculated using a global position system (GPS) or any other distance based system.

If the reinforced response distance (RRD) plus the irreducible response distance (IRD) plus the minimal safe distance (MSD) is greater than the real-time current distance (RTCD) then the alert 1 is generated. The alert is issued before the vehicle 20 enters an unsafe distance from the vehicle 22 in front. The minimal safe distance (MSD) is the minimum distance for the vehicle 20 to stop and is the braking distance (BD) for the current environmental context. Similarly, the reinforced response distance (RRD) is generated for the current driver in the current conditions, as captured during the system training phase.

The alert 2 notification, shown in FIG. 5, relates to the distance required for the vehicle 20 to slow down from a current speed to a target speed using the brake pedal. Here, if the reinforced response distance (RRD) plus the irreducible response distance (IRD) plus the braking distance (BD) plus the minimal safe distance (MSD) is greater than the real-time current distance (RTCD) then an alert 2 is generated. The alert 2 tells the driver of the vehicle 20 to slow down and, as above, is based on the current driver in the current environmental conditions. The system 10 knows the distance RTCD and the speed of the vehicle 22 in front and from this information can check that the current distance between the two vehicles 20 and 22 is a safe distance.

Figure 6:
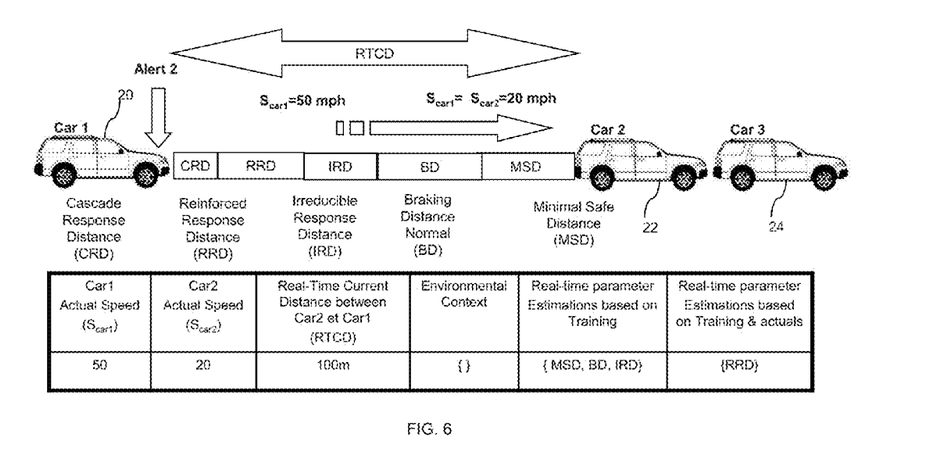

A third type of alert situation is illustrated in FIG. 6, where the behaviour of a third vehicle 24 is additionally taken into account (and indeed multiple further vehicles can be considered in this situation). This third vehicle 24 is ahead of the second vehicle 22, which is ahead of the moving vehicle 20. Essentially a cascade of actions could impact the stopping distance of the moving vehicle 20 and the alert system is amended to take into account the presence of the third vehicle 24 (and any further additional vehicles on the current road). The driver of the moving vehicle 20 is not necessarily aware of the additional vehicles, but the system 10 will automatically adapt to provide an alert, if needed.

The safe distance that must be maintained by the moving vehicle 20 from the second vehicle 22 is extended by a cascade response distance (CRD). The safe distance required is now the sum of the cascade response distance (CRD) plus the reinforced response distance (RRD) plus the irreducible response distance (IRD) plus the normal braking distance (BD plus the minimal safe distance (MSD). If the preceding sum is greater than the current measured (e.g., using GPS) real-time current distance (RTCD), then an alert notification is generated as an output in the vehicle 20. All of this is specific to the current vehicle conditions such as road and weather type as identified.

The cascade response distance (CRD) that is added to the safe distance is calculated by the formula CRD=RRDcar2+CRDcar2−RRDcar1, although the preceding calculated CRD can never be less than 0. In the three vehicle example of FIG. 6, the CRD of car2 will be zero, since there are no further vehicles in front of the third vehicle, so the measure of CRD used is essentially increasing the safe distance if the response time of the second vehicle (as captured in RRDcar2) is worse than (i.e. larger) the response time of the first vehicle (as captured in RRDcar1). If this is the case (i.e., if RRDcar2 exceeds RRDcar1), then the CRD will be greater than zero and the safe distance required is extended. There could be any number of vehicles in front of vehicle 20 that communicate the traveling status of the vehicles in front of vehicle 20. The cascading portion of the invention can be defined by an integer n of at least 2, wherein n denotes the number of vehicles in front of vehicle 20 (n=2 in FIG. 6).

The alert method for car safe distance takes into account response time reinforcement for the braking action. The system 10 can monitor the vehicle's movement, for example, how fast the vehicle is moving, how frequently the vehicle's velocity has changed and to what extent (e.g., by using an accelerometer). The system 10 can monitor the vehicle's equipment and current load, for example, the age of the current brakes, tires and brake fluid, as well as how heavily loaded the vehicle is. The system 10 can monitor the vehicle's current surroundings for example nearby vehicles and other obstacles, the amount of light, the amount of noise and the reduction level of traction due to snow, mud, or rain.

The system 10 can determine the driver's current state, for example a state of being tired given that extremely late at night, or a state of being impaired given that is now dark or the driver is weaving rather than piloting the car straight. The system 10 can calculate the likelihood of difficulty based on analysis using the current and historical data from the above data and generate an alert if the likelihood of difficulty surpasses a given threshold. The alert can be used to avoid a collision, to prevent tiredness (using the detection of increasing time reaction), to decrease traffic congestion (helping to ease the traffic flow by decreasing abrupt braking) to preserve brakes and tires (helping to reduce the usage of the vehicle's element), and for alerting on the vehicle's review (there could be an interface to a specialist).

Figure 7:
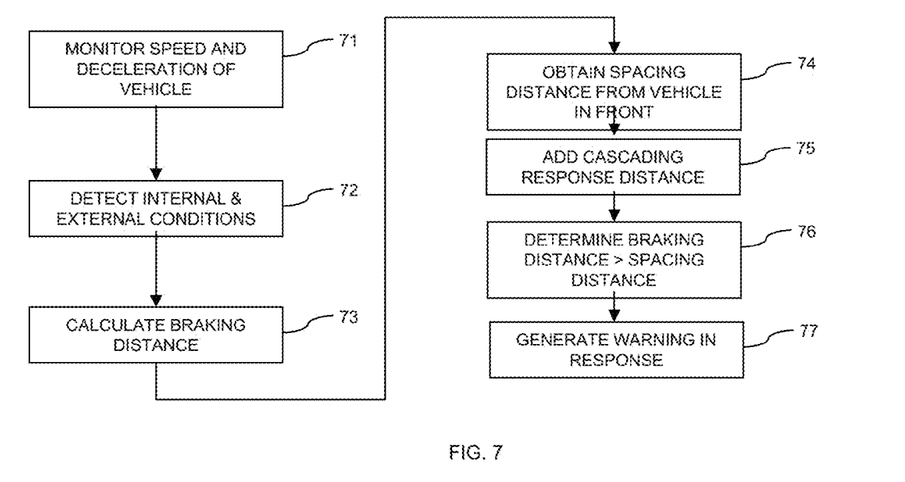
FIG. 7 is a flowchart of a method of generating an output, in accordance with embodiments of the present invention.

FIG. 7 is a flowchart of a method of generating an output, in accordance with embodiments of the present invention.

The method comprises step 71, which comprises monitoring, by the sensor 12, the speed and deceleration of a moving vehicle 20. The system 10, as discussed in detail above, continually monitors the braking of the vehicle 20 to build up a library of comparable braking statistics.

Step 72, comprises detecting, by the detection system 14, one or more external and/or internal conditions relating to the vehicle and/or the vehicle driver. Step 72 could comprise detecting the current road and/or weather conditions, for example. Driver alertness could also be detected, as this can be a major factor in driver and vehicle performance.

Step 73, comprises calculating, by a hardware processor (e.g., processor 16 in FIG. 8) a braking distance for the moving vehicle for the specific detected external and/or internal conditions from the monitored speed and deceleration of the moving vehicle. The system 10 and more specifically, the processor 16 within the system 10 calculates a braking distance from the statistics acquired and for the specific set of conditions that are detected. Weather, for example, may be characterized in simple terms as dry or wet and the driver alertness may be characterised as alert or tired. This leads to four possible combinations of weather and driver alertness, and braking distances are calculated for each of the four combinations.

In operation, at step 74, the method comprises determining, by the processor, a spacing distance between the moving vehicle and a second vehicle ahead of the moving vehicle (e.g., via a GPS system).

Step 75 comprises adding a cascading response distance to the calculated braking distance for a third vehicle ahead of the second vehicle, the cascading response distance calculated from a response distance for the second vehicle relative to the third vehicle. As shown in FIG. 6, the presence of a third vehicle 24 impacts stopping times and distances in the vehicles 20 and 22 behind. Essentially, a proportion of the response distance between vehicles 22 and 24 is added to the total required braking distance of the vehicle 20 as a safety measure. Each additional car in front will also add a small amount to each response distance, hence creating a cascade. The cascading response distance can be a set percentage of the response distance of the vehicle in front. The cascading response distances link together vehicles in a topology that is a social graph with pushing back information from one vehicle to the vehicle behind, using local a wireless connection, for example. The vehicle 20 needs to be informed of the response distance of the vehicle in front 22 and adds a small percentage of this distance to its total stopping distance (which is the sum of the braking distance and the response distance).

Step 76 comprises determining that the calculated braking distance is greater than the obtained spacing distance for the current conditions. Using the example above of four different weather/alertness combinations, the current conditions are used to select a stored braking distance from the four available weather/alertness combinations and the stored braking distance is used to determine if the calculated braking distance is greater than the stored spacing distance. If this is the case, then at step 77, the method comprises generating an output in response to the determination that the calculated braking distance is greater than the stored spacing distance.

Figure 8:
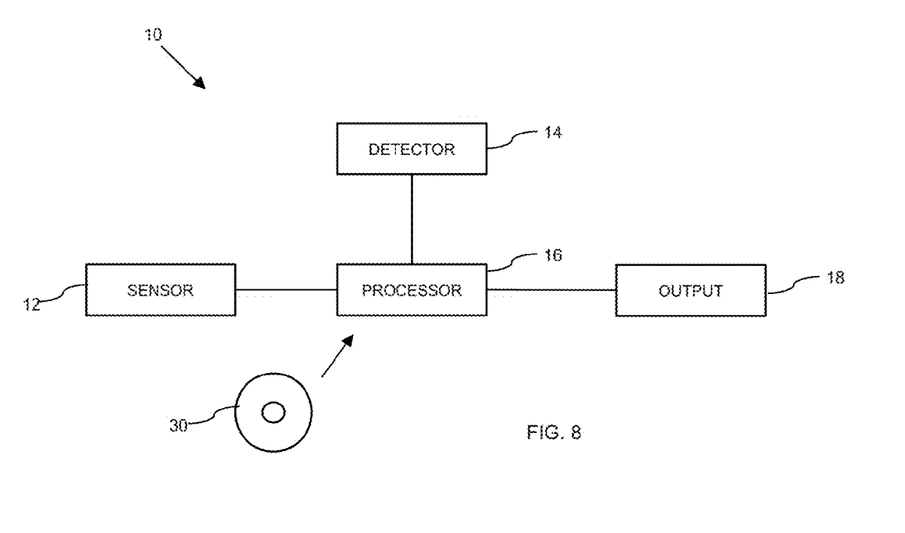
FIG. 8 is a further schematic diagram of the system, in accordance with embodiments of the present invention.

FIG. 8 shows the system 10 as a distributed set of components, with the processor 16 (e.g., a CPU) connected to the sensor 12, the detector 14 and the output device 18. The processor 16 is controlled according to a computer program product on a computer readable storage device or medium 30, which may be a CD-ROM 30 in one embodiment. The computer program product comprises a set of instructions which can be used to control the processor 16. The processor 16 executes the instructions received from the storage device or medium 30 to operate according to the process of FIG. 7.

GLOSSARY

BD (Braking Distance): the distance covered by the moving vehicle as the driver presses the brake pedal until the vehicle does not slow down any more, either stopping, accelerating or keeping a constant speed.

RD (Response Distance): the distance covered by the moving vehicle as the alarm is activated until the driver presses the brake pedal. The distance is composed of two elements, the Irreducible Response Distance (IRD) and the Reinforced Response Distance (RRD).

IRD (Irreducible Response Distance): The duration of time between the warning and the driver action depending on their context (tiredness, surrounding noise, stress etc.). Even in the best driving condition, there is an irreducible response time due to the human physiology. The distance covered by the vehicle during this delay is called the Irreducible Response Distance which is calculated considering the minimal value of the observed RD.

RRD (Reinforced Response Distance): The context of the driver (such as tiredness, surrounding noise, stress etc.) plays an important role in the driver response time. When the driver is tired, the response time may be delayed. The distance covered by the vehicle during this delay is called Reinforced Response Distance which is calculated in relation to the RD and the IRD.

MSD (Minimal Safe Distance): the distance the moving vehicle must cover from its actual speed to stop. This distance is calculated from previous BD observations using the vehicle's speed and environmental context as parameters.

RTCD (Real-Time Current Distance): the total actual distance between the two vehicles which is determined by using a GPS system or any other distance based system.

CRD (Cascade Response Distance): the distance the moving vehicle must cover to compensate from an in-front driver's poor reaction time. The CRD can be calculated as: $CRD=(RRDcar2+CRDcar2)-RRDcar1$.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises a computer readable storage device having computer readable program code stored therein, said program code containing instructions executable by a processor of a computer system to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for managing braking of a moving vehicle to avoid a collision by the moving vehicle, said method comprising:

monitoring, by a sensor, a speed and deceleration of the moving vehicle, wherein the moving vehicle comprises a system that includes a hardware processor, the sensor, a detector, and an output device;

detecting, by the detector, one or more conditions relating to the moving vehicle, a driver of the moving vehicle, or both the moving vehicle and the driver of the moving vehicle, wherein each condition of the one or more conditions is independently an external condition or an internal condition;

calculating, by the processor, a braking distance for the moving vehicle for the detected one or more conditions from the monitored speed and deceleration of the moving vehicle;

determining, by the processor, a spacing distance between the moving vehicle and a second vehicle ahead of the moving vehicle;

adding, by the processor, a cascading response distance to the calculated braking distance for a third vehicle ahead of the second vehicle, the cascading response distance calculated from a response distance for the second vehicle relative to the third vehicle;

after said adding, determining, by the processor, that the calculated braking distance is greater than the determined spacing distance; and in response to the determination that the calculated braking distance is greater than the obtained spacing distance, said output device providing to the driver one or more warning signals to avoid a collision between the moving vehicle and the second vehicle, wherein the one or more warning signals comprise a visual warning signal, an audio warning signal, or both the visual warning signal and the audio warning signal.

2. The method of claim 1, wherein said detecting one or more conditions comprises detecting current road conditions, weather conditions, or both road conditions and weather conditions.

3. The method of claim 1, wherein said calculating the braking distance comprises determining a minimal response distance for a specific monitored speed and deceleration of the moving vehicle and adding an additional response distance for the specific detected one or more conditions.

4. The method of claim 1, said method further comprising:
determining, by the processor, that one or more vehicles are ahead of the third vehicle and in response, adding, by the processor, respective additional cascading response distances to the calculated braking distance, the additional cascading response distances calculated from response distances for the respective one or more vehicles.

5. A system, comprising:
a hardware processor;
a sensor;
a detector; and
an output device,
said system configured to perform a method for managing braking of a moving vehicle to avoid a collision by the moving vehicle, said method comprising:
monitoring, by the sensor, a speed and deceleration of a moving vehicle, wherein the moving vehicle comprises the system;
detecting, by the detector, one or more conditions relating to the moving vehicle, a driver of the moving vehicle, or both the moving vehicle and the driver of the moving vehicle, wherein each condition of the one or more conditions is independently an external condition or an internal condition;
calculating, by the processor, a braking distance for the moving vehicle for the detected one or more conditions from the monitored speed and deceleration of the moving vehicle;
determining, by the processor, a spacing distance between the moving vehicle and a second vehicle ahead of the moving vehicle;
adding, by the processor, a cascading response distance to the calculated braking distance for a third vehicle ahead of the second vehicle, the cascading response distance calculated from a response distance for the second vehicle relative to the third vehicle;
after said adding, determining, by the processor, that the calculated braking distance is greater than the determined spacing distance; and
in response to the determination that the calculated braking distance is greater than the obtained spacing distance, said output device providing to the driver one or more warning signals to avoid a collision between the moving vehicle and the second vehicle, wherein the one or more warning signals comprise a visual warning signal, an audio warning signal, or both the visual warning signal and the audio warning signal.

6. The system of claim 5, wherein said detecting one or more conditions comprises detecting current road conditions, weather conditions, or both road conditions and weather conditions.

7. The system of claim 5, wherein said calculating the braking distance comprises determining a minimal response distance for a specific monitored speed and deceleration of the moving vehicle and adding an additional response distance for the specific detected one or more conditions.

8. The system of claim 5, said method further comprising:
determining, by the processor, that one or more vehicles are ahead of the third vehicle and in response, adding, by the processor, respective additional cascading response distances to the calculated braking distance, the additional cascading response distances calculated from response distances for the respective vehicles.

9. A computer program product, comprising a computer readable storage device having computer readable program code stored therein, said program code containing instructions executable by a hardware processor to implement a method for managing braking of a moving vehicle to avoid a collision by the moving vehicle, said method comprising:
monitoring, by a sensor, a speed and deceleration of the moving vehicle, wherein the moving vehicle comprises a system that includes the hardware processor, the sensor, a detector, and an output device;
detecting, by the detector, one or more conditions relating to the moving vehicle, a driver of the moving vehicle, or both the moving vehicle and the driver of the moving vehicle, wherein each condition of the one or more conditions is independently an external condition or an internal condition;
calculating, by the processor, a braking distance for the moving vehicle for the detected one or more conditions from the monitored speed and deceleration of the moving vehicle;
determining, by the processor, a spacing distance between the moving vehicle and a second vehicle ahead of the moving vehicle;
adding, by the processor, a cascading response distance to the calculated braking distance for a third vehicle ahead of the second vehicle, the cascading response distance calculated from a response distance for the second vehicle relative to the third vehicle;
after said adding, determining, by the processor, that the calculated braking distance is greater than the determined spacing distance; and
in response to the determination that the calculated braking distance is greater than the obtained spacing distance, said output device providing to the driver one or more warning signals to avoid a collision between the moving vehicle and the second vehicle, wherein the one or more warning signals comprise a visual warning signal, an audio warning signal, or both the visual warning signal and the audio warning signal.

10. The computer program product of claim 9, wherein said detecting one or more conditions comprises detecting current road conditions, weather conditions, or both road conditions and weather conditions.

11. The computer program product of claim 9, wherein said calculating the braking distance comprises determining a minimal response distance for a specific monitored speed and deceleration of the moving vehicle and adding an additional response distance for the specific detected one or more conditions.

12. The computer program product of claim 9, said method further comprising:
determining, by the processor, that one or more vehicles are ahead of the third vehicle and in response, adding, by the processor, respective additional cascading response distances to the calculated braking distance, the additional cascading response distances calculated from response distances for the respective one or more vehicles.

* * * * *